(12) United States Patent
Briel et al.

(10) Patent No.: US 9,561,913 B2
(45) Date of Patent: Feb. 7, 2017

(54) APPARATUS FOR CONVEYING FOOD PRODUCTS

(71) Applicant: Weber Maschinenbau GmbH Breidenbach, Breidenbach (DE)

(72) Inventors: Kai-Andre Briel, Biedenkopf (DE); Ingo Rother, Breidenbach (DE)

(73) Assignee: WEBER MASCHINENBAU GMBH BREIDENBACH, Breidenbach (DE)

( * ) Notice: Subject to any disclaimer, the term of this patent is extended or adjusted under 35 U.S.C. 154(b) by 63 days.

(21) Appl. No.: 14/262,126

(22) Filed: Apr. 25, 2014

(65) Prior Publication Data

US 2014/0318339 A1    Oct. 30, 2014

(30) Foreign Application Priority Data

Apr. 25, 2013 (DE) .......................... 10 2013 207 504

(51) Int. Cl.
| | | |
|---|---|---|
| *B65G 21/00* | (2006.01) | |
| *B65G 41/00* | (2006.01) | |
| *B26D 7/32* | (2006.01) | |

(52) U.S. Cl.
CPC .............. *B65G 41/002* (2013.01); *B26D 7/32* (2013.01); *Y10T 83/2092* (2015.04)

(58) Field of Classification Search
CPC ..... B65G 41/002; B65G 41/007; B65G 25/04; B65G 17/005; B26D 7/32; Y10T 83/2092
USPC ..... 83/109, 112, 932; 198/812, 861.1, 861.2
See application file for complete search history.

(56) References Cited

U.S. PATENT DOCUMENTS

| | | | | |
|---|---|---|---|---|
| 389,538 | A * | 9/1888 | Baker ................. | B65G 41/002 198/632 |
| 6,318,224 | B1 * | 11/2001 | Hoyland ................. | B26D 7/32 83/155.1 |
| 7,698,977 | B2 * | 4/2010 | Culling .................... | B26D 7/32 83/155 |
| 7,832,316 | B2 * | 11/2010 | Weber ..................... | B26D 9/00 198/357 |

(Continued)

FOREIGN PATENT DOCUMENTS

| | | |
|---|---|---|
| DE | 19839257 A1 | 3/2000 |
| DE | 10 2008 019985 A1 | 10/2009 |
| GB | 912 499 A | 12/1962 |

OTHER PUBLICATIONS

European Search Report mailed Jul. 30, 2014, from European Application No. 14156106.8 (4 pages).

(Continued)

*Primary Examiner* — Omar Flores Sanchez

(74) *Attorney, Agent, or Firm* — Kilpatrick Townsend & Stockton, LLP

(57) ABSTRACT

Disclosed is a conveying device configured to convey food products located on a product support surface along a product conveying direction. The conveying device is adjustable with respect to a stationary base of the apparatus, with an adjustment device being provided for adjusting the conveying device. The adjustment device has a first articulated arm arrangement and a second articulated arm arrangement spaced apart therefrom. The articulated arm arrangements each have a first articulated arm pivotally connected to the base and a second articulated arm pivotally connected to the conveying device, with mutually corresponding articulated arms being pivotable about respective parallel pivot axes.

19 Claims, 3 Drawing Sheets

(56) References Cited

U.S. PATENT DOCUMENTS 8,336,434 B2 * 12/2012 Sandberg ................. B26D 5/32
426/518

OTHER PUBLICATIONS

Search Report mailed Apr. 2, 2014, from corresponding German Application No. 102013207504.9 (11 pages).
Volmer, Johannes, Hrsg., Getriebetechnik—Koppelgetriede, Berlin, Verl. Technik., 1979, pp. 302-305. (No Translation).

* cited by examiner

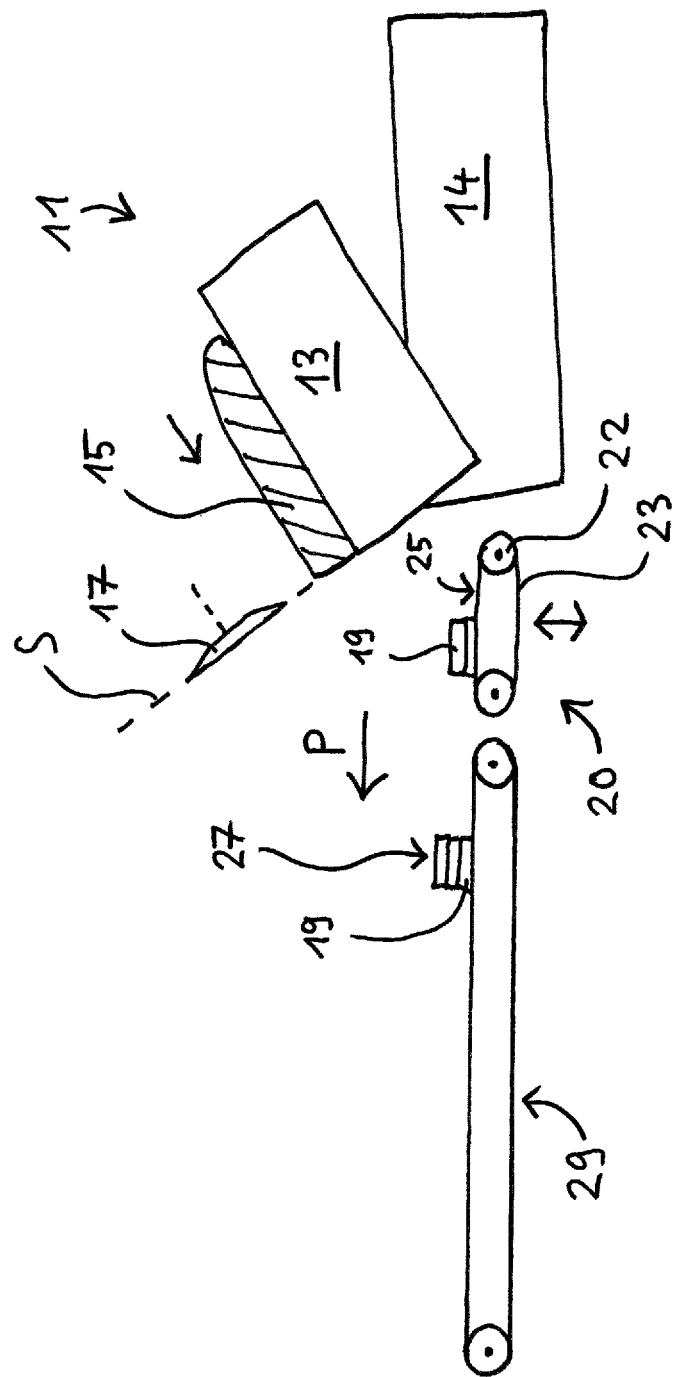

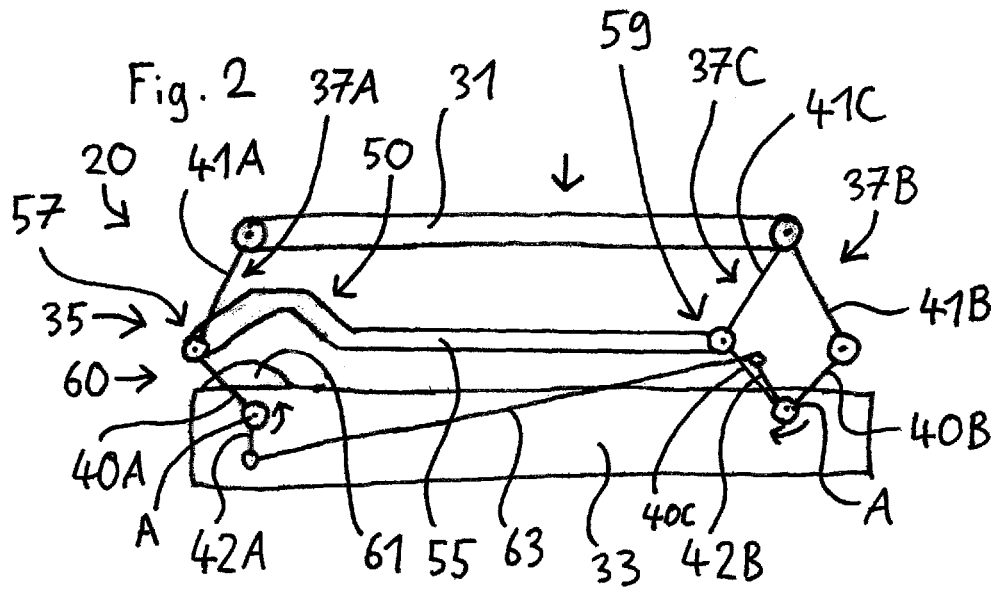
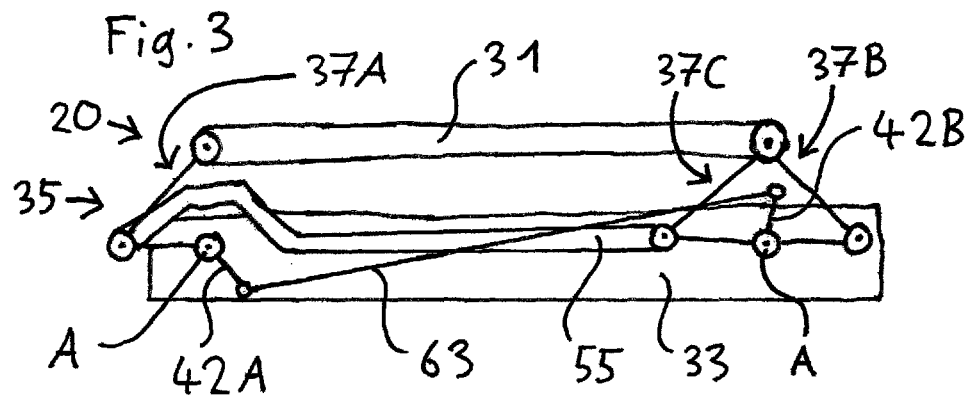

APPARATUS FOR CONVEYING FOOD PRODUCTS

The present invention relates to an apparatus for conveying food products, in particular to a portioning conveying unit, having at least one conveying device which is configured to convey food products located on a product support surface along a product conveying direction, with the conveying device being adjustable with respect to a stationary base of the apparatus.

Adjustable conveying devices are required for different purposes in the industrial processing of food products. Portioning conveying units, for example, serve to assemble slices of sausage or cheese sliced by a high performance slicer into portions. The individual slices can be stacked or arranged overlapping on the product support surface of the portioning conveying unit and can be transported away after completion of the portion. It may be desirable in this respect to adjust the height of the product support surface in the course of stacking in order thus to ensure an ideal positioning for each product slice. If overlapping portions are desired, the product support surface furthermore has to be adjustable transversely and/or longitudinally. An adjustment in the longitudinal direction, that is in the product conveying direction, can e.g. take place by the anyway possible movement of the conveying means, for example of a continuous conveyor belt, without an adjustment of the conveying unit or of a component thereof being necessary as a whole. Other measures are required in contrast for a vertical or transverse adjustment.

Conveying units with an adjustable product support surface can, however, also be arranged at other points within a production line for food products.

The adjustment of the conveying device with respect to the stationary base can take place by means of a spindle drive, for example. Spindle drives are, however, relatively high-maintenance. There is additionally the problem in the processing of food products that the spindles can frequently only be cleaned with a relatively high effort.

It is an object of the invention to use simple means to provide an adjustable conveying device for food products which allows the observation of high functional and hygienic demands with a cleaning capability which is as simple as possible.

The object is satisfied by an apparatus for conveying food products having the features of claim 1.

In accordance with the invention, an adjustment apparatus is provided for adjusting the conveying device, said adjustment apparatus comprising at least one first articulated arm arrangement and one second articulated arm arrangement spaced apart therefrom, each comprising at least one first articulated arm pivotally connected to the base and one second articulated arm pivotally connected to the conveying device, wherein mutually corresponding articulated arms of the first and the second articulated arm arrangements are pivotable in opposite directions and/or in the same sense about respective parallel pivot axes.

The invention is inter alia based on the recognition that articulated arm arrangements can be cleaned substantially more easily than, for example, spindle drives. A secure support of the conveying device is ensured by the engagement of the articulated arm arrangements at two spaced apart pivot connection points. A pivoting of mutually corresponding articulated arms allows a vertical adjustment and/or a lateral adjustment of the product support surface depending on the configuration. If required, a vertical adjustment, a transverse adjustment and a longitudinal adjustment can be combined with one another in a suitable manner. An advantage of the invention can then be seen in the fact that an adjustment device which is based on pivotable articulated arms can be manufactured particularly simply and inexpensively.

Further developments of the invention are set forth in the dependent claims, in the description and in the enclosed drawing.

An embodiment of the invention provides that the first and the second articulated arm arrangements are spaced apart from one another transversely to the product conveying direction and are preferably arranged at lateral end regions of the conveying device. This allows a particularly stable support of the carrier structure of the conveying device, in particular in the case in which the extent of the product support surface transversely to the conveying direction is considerably larger than the extent of the product support surface in the product conveying direction.

The pivot axes preferably extend parallel to the product conveying direction. I.e. the articulated arms swing out on the pivoting transversely to the product conveying direction, which is particularly favorable with respect to the available construction space.

The adjustment device can be designed such that the inclination of the product support surface is maintained on an adjustment of the conveying device. It may, for example, be desirable that the product support surface always remains horizontal during the portion preparation in order not to impair the stack formation. This can be achieved by a suitable coordination of the pivot movement of the articulated arms and/or by additional measures such as in particular guide devices active at a suitable point.

A further embodiment of the invention provides that a third articulated arm arrangement is provided which comprises at least one first articulated arm pivotally connected to the base and a second articulated arm pivotally connected to the conveying device, with in particular the first and the second articulated arms of the third articulated arm arrangement being pivotal in the same direction and synchronously to corresponding articulated arms of the first articulated arm arrangement. An unwanted tilting of the conveying device can be avoided in a particularly advantageous manner by such a third articulated arm arrangement. A stable guidance for the adjustable conveying device can in particular be provided by a compulsory coupling of two or three articulated arm arrangements in the sense of movements of mutually corresponding articulated arms which are of the same direction and synchronous.

The third articulated arm arrangement is preferably arranged between the first articulated arm arrangement and the second articulated arm arrangement. This allows a particularly compact manner of construction.

It is furthermore preferred for the first and/or the second articulated arms of the first articulated arm arrangement, the first articulated arm of the third articulated arm arrangement and the second articulated arm of the third articulated arm arrangements to be pivotally connected to a common rigid coupling element. In this manner, a compulsory coupling of the two articulated arm arrangements can be achieved in that the conveying device is uniformly supported at the two upper pivotal connection points so that an unwanted tiling of the product support surface is therefore precluded. The rigid coupling element can be a lever, for example in the form of a plate element or of a section element, which is simple to manufacture.

A specific embodiment of the invention provides that the first articulated arms of the first and the third articulated arm arrangements pivotally connected to the coupling element and/or the second articulated arms of the first and the third articulated arm arrangements pivotally connected to the coupling element are each of the same length and are in parallel with one another. In other words, two adjacent parallelograms are formed by the pivotal connection points of the first and the third articulated arm arrangements. These adjacent parallelograms preferably have one side in common.

In principle, the first and the second articulated arms of the third articulated arm arrangement could also be pivotally connected to the coupling element at mutually spaced apart pivotal connection points. In such an embodiment, the first and the second articulated arms of the third articulated arm arrangement would not be directly connected. A section of the rigid coupling element would rather be located as an intermediate arm between the upper pivotal connection point of the lower articulated arm and the lower pivotal connection point of the upper articulated arm so that the two parallelograms defined by the pivotal connection points would be mutually offset by a specific angle.

In accordance with a further embodiment of the invention, each articulated arm of the first articulated arm arrangement and/or of the second articulated arm arrangement is formed by a pair of parallel levers of equal length which are each arranged offset along the pivot axis. The stability of the overall arrangement can hereby be further increased. The respective parallel lever arrangements can be connected to one another at the articulated points by hinge pins or the like. The parallel levers are preferably configured in the form of plate-like components.

A further embodiment of the invention provides that a drive device is provided for the common pivoting of mutually corresponding articulated arms of the first articulated arm arrangement and of the second articulated arm arrangement. A fast, automatic adjustment of the conveying device is possible in this manner. For example, the drive device can comprise one or more electric motors.

A specific embodiment of the invention provides that the drive device has a first drive associated with the first articulated arm arrangement, with a coupling arrangement, in particular a crank drive, being provided for transmitting a driving force from the first drive to the second articulated arm arrangement, in particular such that mutually corresponding articulated arms of the first and the second articulated arm arrangements are pivotable in opposite directions for the vertical adjustment of the conveying device. In the simplest case, the first drive can have a motor with a rotatable drive shaft which directly or indirectly effects a pivoting of the first articulated arm of the first articulated arm arrangement. A simultaneous oppositely directed pivoting of the first articulated arm of the second articulated arm arrangement can thus takes place in a compulsory manner via a crank drive so that no separate drive is required for the second articulated arm arrangement. Depending on the application, the first drive and the coupling arrangement can engage at the first articulated arms or at the second articulated arms of the first and the second articulated arm arrangements. In principle, the first and the second articulated arm arrangements can also each comprise more than two articulated arms, with the drive or the coupling arrangement engaging at coupling members arranged between the first and the second articulated arms.

A further embodiment of the invention provides that the drive device has a first drive associated with the first articulated arm arrangement and a second drive associated with the second articulated arm arrangement, with the first drive and the second drive being operable independently of one another, in particular such that the conveying device is adjustable transversely to the product conveying direction. In accordance with a particularly preferred embodiment, the two drives are arranged directly at respective lower pivot axes of the first articulated arms. Either a vertical adjustment or a lateral adjustment as well as, where required, a combination of vertical adjustment and lateral adjustment of the conveying device can be effected depending on the type of control by two independently controllable drives, for example, electric motors.

The conveying device can in particular be configured as a belt conveyor or as a strip conveyor. The second articulated arms of the first and the second articulated arm arrangements can in this respect be directly pivotally connected to a carrier structure or to a frame of the belt conveyor or strip conveyor.

The invention also relates to a production line having at least one cutting apparatus for slicing food products, in particular a high performance slicer, and having at least one apparatus for conveying sliced food products which is configured as described above and in the following.

The invention will be described in the following by way of example with reference to the drawings.

FIG. 1 is a schematic representation of a production line in accordance with the invention which comprises a high performance slicer and an apparatus for conveying food products;

FIG. 2 shows a product conveying device in accordance with a first embodiment of the invention in a first vertical position;

FIG. 3 shows the product conveying apparatus in accordance with FIG. 2 in a second vertical position;

Figure 4:
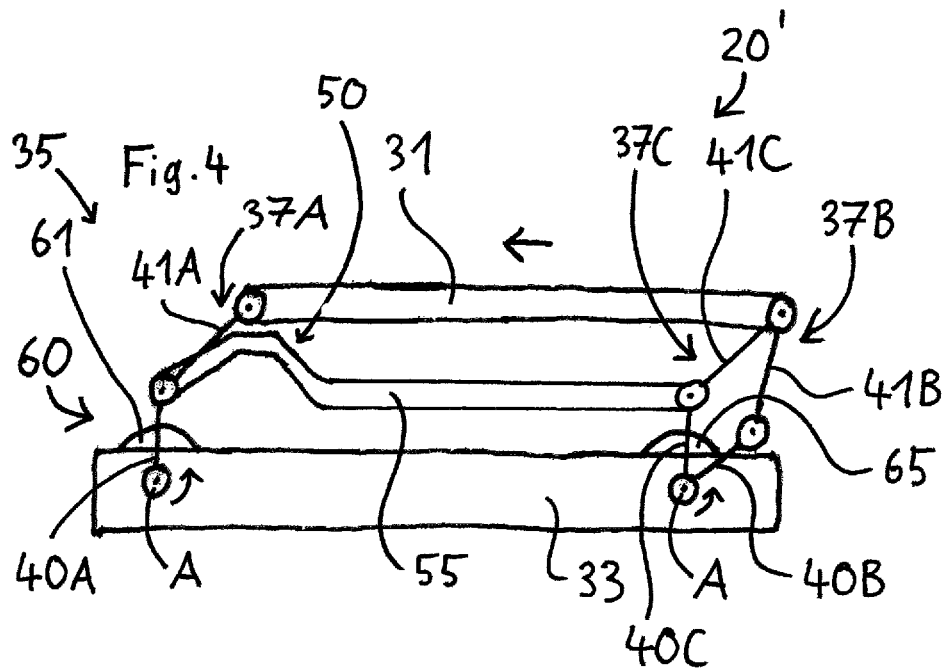
FIG. 4 shows a product conveying apparatus in accordance with a second embodiment of the invention in a first lateral position.

A high performance slicer 11 is shown schematically in FIG. 1 which has a product feed 13. The product feed 13 serves to supply food products 15 such as sausage bars on a plurality of conveyor tracks to a cutting plane S in which a cutting blade 17 moves, in particular revolving in a rotating manner and/or in a planetary motion. As shown, the product feed 13 is inclined with respect to a base frame 14 of the high performance slicer 11. Product slices 19 cut off by the cutting blade 17 fall onto a portioning conveying unit 20 which is arranged directly next to the cutting plane S and which here comprises a belt conveyor 22 having a conveyor belt 23. The upper side of the conveyor belt 23 in this respect forms a planar product support surface 25 for the product slices 19. The portioning conveying unit 20 is controllable by an electronic control device, not shown, to convey product portions 27 of stacked product slices 19 along a product conveying direction P onto a downstream outgoing conveyor 29. The outgoing conveyor 29 in the embodiment shown is likewise configured as a belt conveyor and serves to supply completed product portions 27 to a further processing, for example to a packaging machine. In general, multistrip conveyors, roller conveyors or the like can also be provided instead of belt conveyors.

In order to position the individual product slices 19 in a desired manner on the product support surface 25 on the preparation of product portions 27, the portion conveying unit 20 is adjustable transversely to the product conveying direction P, i.e. is vertically adjustable and/or transversely adjustable depending on the application. A longitudinal adjustment of the product support surface 25 in or against the product conveying direction P can in contrast take place by a suitable control of a drive of the conveyor belt 23.

As can be seen from FIGS. 2 and 3, the adjustment of the product support surface 25 takes place by an adjustment device 35 which is arranged between a carrier structure 31 of the belt conveyor 22 and a stationary base 33 of the portioning conveying unit 20. The adjustment device 35 comprises three articulated arm arrangements 37A, 37B, 37C which are spaced apart from one another transversely to the product conveying direction P. A first articulated arm arrangement 37A and a second articulated arm arrangement 37B are arranged at respective lateral end regions of the portioning conveying unit 20 and each have a first articulated arm 40A, 40B pivotally connected to the base 33 and a second articulated arm 41A, 41B pivotally connected to the carrier structure 31. As shown, both the first articulated arms 40A, 40B and the second articulated arms 41A, 41B of the first and the second articulated arm arrangements 37A, 37B are pivotable in opposite directions about respective parallel pivot axes A. The pivot axes A extend parallel to the product conveying direction P in this respect.

A third articulated arm arrangement 37C arranged between the first articulated arm arrangement 37A and the second articulated arm arrangement 37B likewise has a first articulated arm 40C and a second articulated arm 41C which are coupled to the first articulated arm arrangement 37A via a rigid coupling element 55. The plate-like coupling element 55 has a bend 50 and is pivotably connected at a first end 57 to the first articulated arm 40A and to the second articulated arm 41A of the first articulated arm arrangement 37A. At its second end 59, the coupling element 55 is pivotably coupled to the first articulated arm 40C and to the second articulated arm 41C of the third articulated arm arrangement 37C. The bend 50 avoids an impact of the rigid coupling element 55 at components of the pivot bearing and can also be provided at another position or be omitted in dependence on the specific construction circumstances.

In the embodiment shown, the first articulated arm arrangement 37A and the third articulated arm arrangement 37C are pivotally connected at opposite end regions of the carrier structure 31, whereby a particularly high stability results. Depending on what appears favorable on the basis of the application, the first articulated arm 40C and the second articulated arm 41C of the third articulated arm arrangement 37C can also be pivotally connected at any other desired point to the base 33 or to the carrier structure 31. The first articulated arm arrangement 37A and the third articulated arm arrangement 37C could specifically be moved closer to one another. The rigid coupling element 55 could then be designed correspondingly shorter.

A drive device 60 of the adjustment device 35 comprises a drive motor 61 which is associated with the first articulated arm arrangement 37A, which is preferably configured as an electric motor and which has a motor shaft, not shown, which directly or indirectly drives the pivot axis A of the first articulated arm 40A of the first articulated arm arrangement 37A. A crank drive 63 transmits the driving force of the drive motor 61 to the pivot axis A of the first articulated arm 40B of the second articulated arm arrangement 37B. The crank drive 63 has a first crank arm 42A and a second crank arm 42B which are each pivotable together with the associated first articulated arm 40A, 40B as a rigid unit about the corresponding pivot axis A.

On a pivoting of the first articulated arm 40A of the first articulated arm arrangement 37A by means of the drive motor 61 counter clockwise, as shown in FIG. 2, a simultaneous pivoting of the first articulated arm 40B of the second articulated arm arrangement 37B thus takes place clockwise so that the first articulated arms 40A, 40B just like the second articulated arms 41A, 41B of the first articulated arm arrangement 37A and of the second articulated arm arrangement 37B are therefore each pivoted in opposite directions to one another and the first articulated arm arrangement 37A and the second articulated arm arrangement 37B are consequently shortened overall. As a result, a vertical adjustment of the carrier structure 31 takes place relative to the base 33 into the low position shown in FIG. 3. The third articulated arm arrangement 37C in this respect provides that no unwanted tilting of the carrier structure 31 occurs so that the product support surface 25 always remains exactly horizontal during the vertical adjustment. A specific intended inclination of the product support surface 25 differing from the horizontal alignment could equally be maintained. The position of the carrier structure 31 and thus of the product support surface 25 in the transverse direction, that is in a horizontal plane perpendicular to the product conveying direction P, does not change due to the vertical adjustment, i.e. no lateral displacement takes place in this respect.

Figure 5:
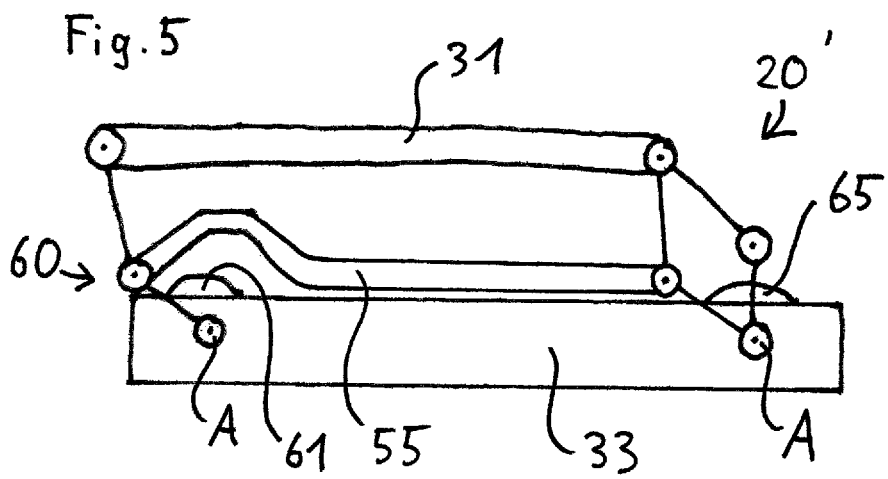
FIG. 5 shows the product conveying apparatus in accordance with FIG. 4 in a second lateral position.

FIGS. 4 and 5 show an alternative embodiment of a portioning conveying unit 20' in accordance with the invention which in principle has a similar structure to the portioning conveying unit 20 shown in FIGS. 2 and 3. In addition to the drive motor 61 associated with the first articulated arm arrangement 37A, the drive device 60 here comprises a further drive motor 65 which is associated with the second articulated arm arrangement 37B. The two drive motors 61, 65 can be driven independently of one another in this respect. Since the first articulated arm arrangement 37A and the second articulated arm arrangement 37B are individually drivable, no crank operation is provided for coupling the first articulated arms 40A, 40B. This opens up the possibility by a synchronous driving counterclockwise in the same sense of the two drive motors 61, 65, as shown in FIG. 4, of effecting a transverse displacement of the carrier structure 31 with respect to the base 33 into the left hand position shown in FIG. 5. The height of the product support surface 25 remains the same in this respect. Apart from this, it is naturally also possible in the embodiment in accordance with FIGS. 4 and 5 to drive the lower articulated arms 40A, 40B in opposite directions and synchronously in order thus to effect a vertical adjustment of the carrier structure 31 with respect to the base 33.

It can be seen from FIGS. 2-5 that the first articulated arms 40A, 40C of the first and the third articulated arm arrangements 37A, 37C pivotally connected to the coupling element 55 just like the second articulated arms 41A, 41C of the first and the third articulated arm arrangements pivotally connected to the coupling element 55 are each of equal length and are in parallel with one another so that two parallelograms are defined by the corresponding pivotal connection points.

As a result, the invention makes possible a reliable and exact adjustment of a portioning conveying unit 20 as required in the vertical direction and/or in the horizontal direction, with the associated adjustment device 35 being considerably easier to manufacture and in particular being easier to clean than a spindle drive, for example.

REFERENCE NUMERAL LIST 11 high performance slicer
13 product feed
14 base frame
15 product 17 cutting blade
19 product slice
20, 20' portioning conveying unit
22 belt conveyor
23 conveyor belt
25 product support surface
27 product portion
29 outgoing conveyor
31 carrier structure
33 base
35 adjustment device
37A first articulated arm arrangement
37B second articulated arm arrangement
37C third articulated arm arrangement
40A-C first articulated arm
41A-C second articulated arm
42A first crank arm
42B second crank arm
50 bend
55 coupling element
57 first end
59 second end
60 drive device
61 first drive motor
63 crank drive
65 second drive motor
S cutting plane
P product conveying direction
A pivot axis

The invention claimed is:

1. An apparatus for conveying food products, comprising at least one conveying device which is configured to convey food products located on a product support surface along a product conveying direction, wherein the conveying device is adjustable with respect to a stationary base of the apparatus,
the apparatus further comprising an adjustment device for adjusting the conveying device, said adjustment device comprising at least one first articulated arm arrangement and one second articulated arm arrangement spaced apart therefrom, the first and the second articulated arm arrangement each comprising at least one first articulated arm pivotally connected to the base and one second articulated arm pivotally connected to the conveying device, wherein mutually corresponding articulated arms of the first and the second articulated arm arrangements are pivotable in opposite directions and/or in the same direction about respective parallel pivot axes; and
the apparatus further comprising a third articulated joint arm arrangement which comprises at least one first articulated arm pivotally connected to the base and one second articulated arm pivotally connected to the conveying device.

2. The apparatus in accordance with claim 1, wherein the first and the second articulated arm arrangements are spaced apart from one another transversely to the product conveying direction.

3. The apparatus in accordance with claim 2, wherein the first and the second articulated arm arrangements are arranged at lateral end regions of the conveying device.

4. The apparatus in accordance with claim 1, wherein the pivot axes extend parallel to the product conveying direction.

5. The apparatus in accordance with claim 1, wherein the adjustment device is configured such that an inclination of the product support surface is maintained on an adjustment of the conveying device.

6. The apparatus in accordance with claim 1, wherein the first and the second articulated arms of the third articulated arm arrangement are pivotable in the same direction and synchronously with corresponding articulated arms of the first articulated arm arrangement.

7. The apparatus in accordance with claim 1, wherein the third articulated arm arrangement is arranged between the first articulated arm arrangement and the second articulated arm arrangement.

8. An apparatus in accordance with claim 1, wherein at least one of the first and the second articulated arms of the first articulated arm arrangement, the first articulated arm of the third articulated arm arrangement and the second articulated arm of the third articulated arm arrangement is pivotally connected to a common rigid coupling element.

9. The apparatus in accordance with claim 8, wherein the first articulated arms of the first and third articulated arm arrangements pivotally connected to the coupling element and/or the second articulated arms of the first and third articulated arm arrangements pivotally connected to the coupling element are each of the same length and are parallel to one another.

10. The apparatus in accordance with claim 8, wherein the first and the second articulated arms of the third articulated arm arrangement are pivotally connected to the coupling element at mutually spaced apart pivotal connection points.

11. The apparatus in accordance with claim 1, wherein each articulated arm of the first articulated arm arrangement and/or of the second articulated arm arrangement is formed by a pair of parallel levers of equal length which are each arranged offset along the pivot axis.

12. The apparatus in accordance with claim 1, further comprising a drive device for the common pivoting of mutually corresponding articulated arms of the first articulated arm arrangement and of the second articulated arm arrangement.

13. The apparatus in accordance with claim 12, wherein the drive device has a first drive associated with the first articulated arm arrangement, with a coupling arrangement being provided for transferring a driving force from the first drive to the second articulated arm arrangement.

14. The apparatus in accordance with claim 13, wherein the coupling arrangement is provided for transferring a driving force from the first drive to the second articulated arm arrangement such that mutually corresponding articulated arms of the first and the second articulated arm arrangements are pivotable in opposite directions for a vertical adjustment of the conveying device.

15. The apparatus in accordance with claim 12, wherein the drive device (60) has a first drive (61) associated with the first articulated arm arrangement (37A) and a second drive (65) associated with the second articulated arm arrangement (37B), with the first drive (61) and the second drive (65) being operable independently of one another.

16. The apparatus in accordance with claim 15, wherein the first drive (61) and the second drive (65) are operable independently of one another such that the conveying device (22) is adjustable transversely to the product conveying device (P).

17. The apparatus in accordance with claim 1, wherein the conveying device is configured as one of a belt conveyor and a strip conveyor.

18. A production line comprising:
at least one cutting apparatus for slicing food products and at least one apparatus for conveying sliced food products comprising at least one conveying device which is configured to convey food products located on a product support surface along a product conveying direction, wherein the conveying device is adjustable with respect to a stationary base of the apparatus, the apparatus further comprising an adjustment device for adjusting the conveying device, said adjustment device comprising at least one first articulated arm arrangement and one second articulated arm arrangement spaced apart therefrom, the first and the second articulated arm arrangement each comprising at least one first articulated arm pivotally connected to the base and one second articulated arm pivotally connected to the conveying device, wherein mutually corresponding articulated arms of the first and the second articulated arm arrangements are pivotable in opposite directions and/or in the same direction about respective parallel pivot axes; and
the apparatus further comprising a third articulated joint arm arrangement which comprises at least one first articulated arm pivotally connected to the base and one second articulated arm pivotally connected to the conveying device.

19. The production line in accordance with claim 18, wherein the at least one cutting apparatus for slicing food products is a high performance slicer.

* * * * *